INVENTORS.
GEORGE L. SIEGEL &
WILLIAM C. POLAND JR.
BY Richard S. Shreve Jr.
ATTORNEY

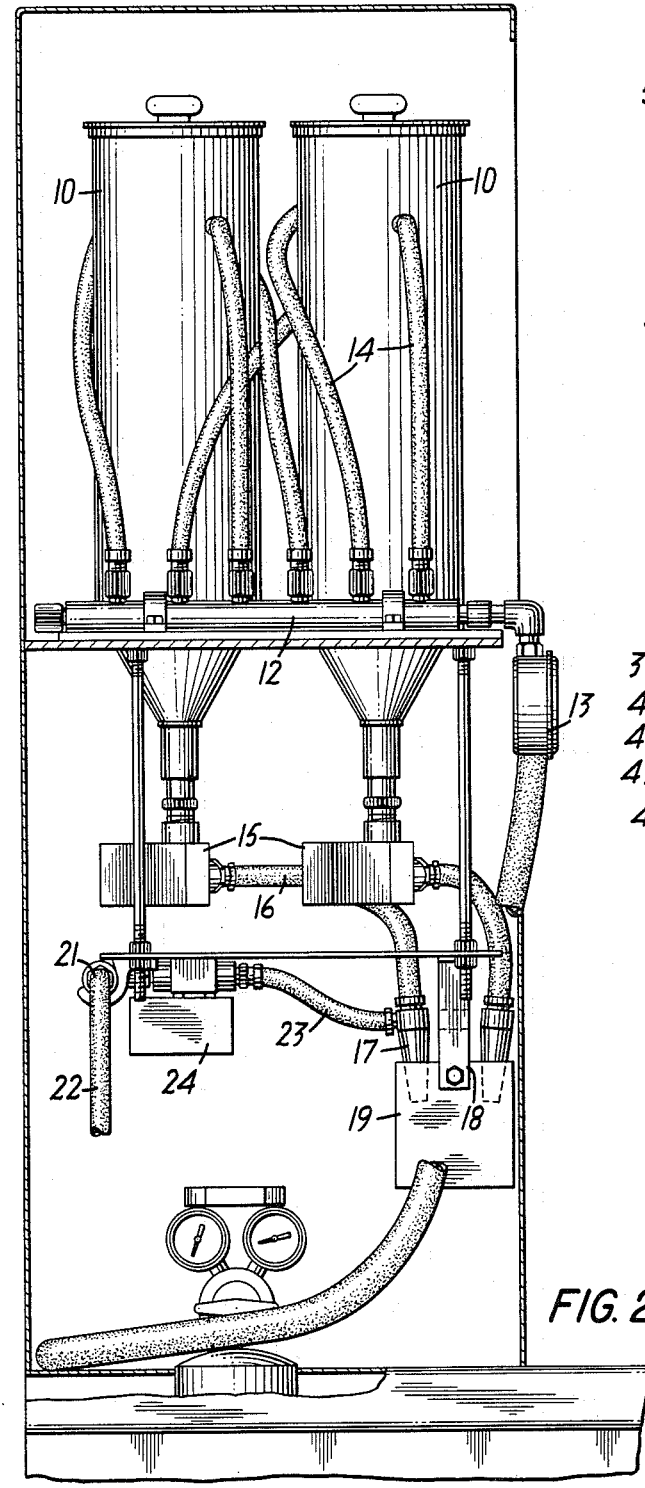
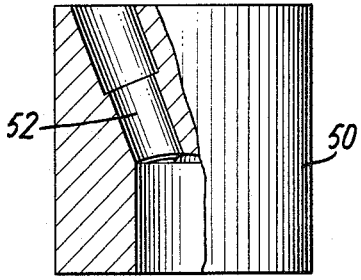
FIG. 5
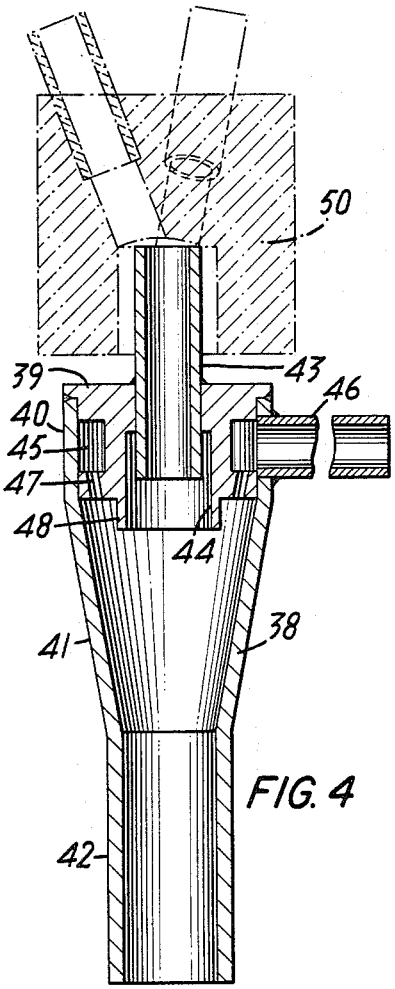
FIG. 4
FIG. 2
INVENTORS.
GEORGE L. SIEGEL &
WILLIAM C. POLAND JR.
BY Richard S. Shreve Jr
ATTORNEY Nov. 16, 1965     G. L. SIEGEL ETAL     3,218,175
METHOD AND APPARATUS FOR DISPENSING POWDERED-LIQUID FOOD
Filed Sept. 18, 1962     4 Sheets-Sheet 3

INVENTORS.
GEORGE L. SIEGEL &
WILLIAM C. POLAND JR.
BY
Richard S. Shreve
ATTORNEY

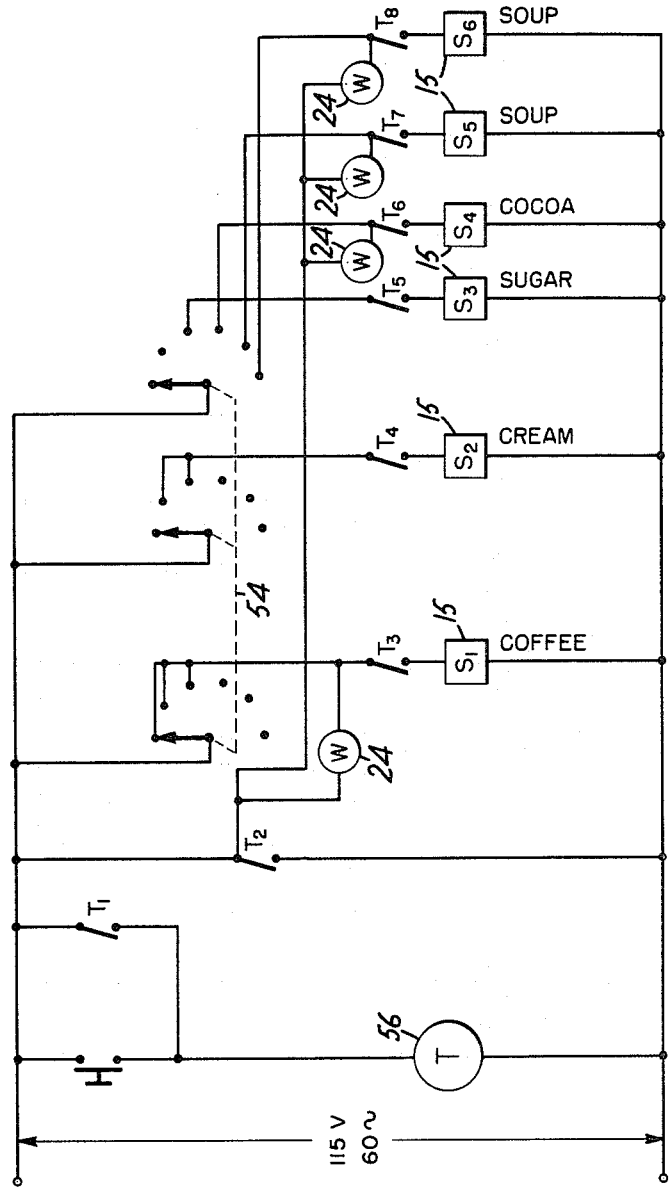

United States Patent Office 3,218,175
Patented Nov. 16, 1965

3,218,175
METHOD AND APPARATUS FOR DISPENSING POWDERED-LIQUID FOOD
George L. Siegel, Neptune, and William C. Poland, Jr., Irvington, N.J., assignors to Union Carbide Corporation, a corporation of New York
Filed Sept. 18, 1962, Ser. No. 224,340
10 Claims. (Cl. 99—28)

This invention relates to a method and apparatus for dispensing liquid foods and beverages, such as used in coin operated vending machines. More particularly, the invention relates to a method and apparatus for dispensing a controlled quantity of a powdered food, such as coffee, chocolate, or soup, into a nozzle where it is mixed with a controlled quantity of liquid, the mixture then passing into a cup for consumption by the customer.

Unless the proper amount of the powdered material is mixed with the liquid, the resulting product will suffer in taste appeal or even be unpalatable. Therefore, elaborate and complicated mechanisms have been used to ensure repetitive dispensing of the required amount of powdered material. These mechanisms are not only of high initial cost, but also difficult and time-consuming to disassemble for repair and cleaning. In addition, dispensers of this type are subject to clogging and jamming.

The means of mixing the powered material and the liquid most frequently employed uses the mixing bowl principle. That is, the powder dispenser deposits a measured quantity of powdered material into a mixing bowl. A stream of water enters the bowl tangentially to pick up and wet the powder and impart a swirling motion to the mixture as it passes down into an outlet opening in the bottom of the bowl. Any sluggishness in dropping the powder into the bowl or any differences in the pattern of the water entering the bowl may well result in some of the powder remaining in the bowl to be flushed out, perhaps in the next drink. The result is that drinks of varying strength are supplied in the case where only one beverage is provided.

In the case where more than one type of beverage is being dispensed and a common mixing bowl used for all beverages, as is commonly the case, the result is that the flavors of the various drinks may well be affected. That is, soup tasting of coffee, and vice versa, may be dispensed. In addition, this incomplete flushing out of the mixing bowl provides a very objectionable sanitation problem.

The prior art apparatus most often includes heaters and fans to circulate warm air around and/or through the powder to reduce the tendency for the powder to become wet and gummy and, therefore, nonflowable due to variations in atmospheric humidity.

Accordingly, the main object of the present invention is to provide a method and apparatus for dispensing a beverage in which the measured amounts of the ingredients in each dispensed beverage remains constant whereby the taste and flavor of the beverage is maintained the same throughout repetitive dispensing operations.

Further objects are to provide a method and apparatus for dispensing a plurality of different beverages in which there is no intermixing or carryover of one beverage into another whereby the taste and flavor of each beverage remains constant throughout repetitive dispensing operations; to provide apparatus for storing and dispensing measured amounts of powdered food which is simple and relatively inexpensive in construction, easy to repair, and contains no moving parts which necessitate frequent disassembly for cleaning purposes; and to provide mixing means in a dispensing apparatus wherein thorough mixing and complete dissolution of a powdered food in a liquid takes place prior to entry of the mixture into a receiving cup and the mixing means is completely free of any residue powder after each dispensing operation.

These and other objects are achieved by the method and apparatus of the invention basically through the combined use of a closed, pressure-tight powdered food container including a powder metering means which operates in conjunction with a pressurizing and conveying gas; a dry inert gas such as nitrogen as the pressurizing and conveying medium; a positive powder shut-off valve; a mixing nozzle wherein the powdered material is fed into the center of an annular liquid stream; and a separate mixing nozzle provided for each of the different beverages being dispensed.

FIGURE 2 is a side elevation of the same;

FIGURE 4 is an enlarged detailed vertical section through the water mixing nozzle employed in FIGS. 1 and 2;

FIGURE 5 is an elevation partly in section of a powder mixing adaptor employed with FIG. 4; and FIGURE 6 is a wiring diagram for the solenoid valves employed in FIGS. 1 and 2.

Figure 1:
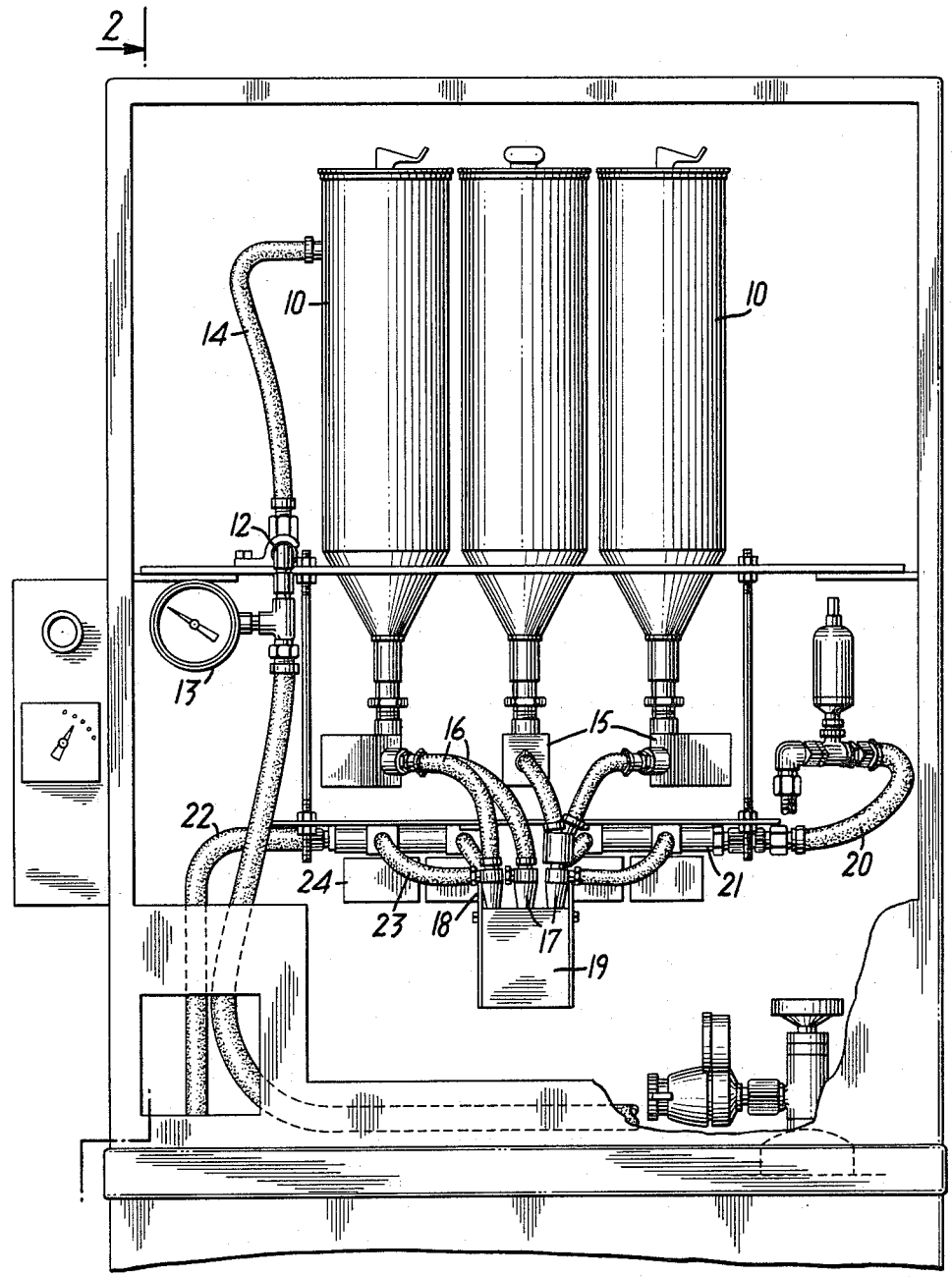
FIGURE 1 is a front elevation of apparatus according to, and for carrying out the method of, the preferred embodiment of the present invention.

An exemplary assembly of the apparatus of the invention is shown in FIG. 1, as designed to provide four different beverages such as coffee, cocoa, and two varieties of soups, plus cream and sugar for the coffee, should it be desired. As shown, this assembly comprises six powdered food dispensers or hoppers 10 into which inert gas is fed through tubing 14 from inert gas manifold 12 which is supplied with inert gas at regulated pressure by means of the adjustable regulator 13 from a high pressure gas source not shown. The "on-off" flow of powder from dispensers 10 is controlled by means of an electrically operated shut-off valve 15 connected to the outlet of each of the dispensers 10. Solenoid valves of the diaphragm-operated type have been found to provide the required positive shut-off.

Powder tubing 16 conveys the metered powdered food from the outlet of the shut-off valves 15 to the powder inlet of the individual mixing nozzles 17. It will be noted that the powder tubing 16 is of a minimum length between the outlet of shut-off valve 15 and mixing nozzle 17 with no sharp bends in the powder flow path through the tubing. The purpose of this, of course, is to eliminate any tendency for the powder to "pile up" or clog the tubing, but rather to promote a smooth essentially downward flow of the powder to the mixing nozzle.

There are four mixing nozzles 17, one for each beverage to be dispensed. The mixing nozzles 17 are arranged in a circle and supported at a converging angle in nozzle bracket 18 such that the liquid discharged from any one of the nozzles will be directed into a receiving cup 19 positioned beneath the nozzle bracket 18. This arrangement has the advantage of eliminating any costly combination of electrical and mechanical mechanisms for centering the discharge outlet of a particular mixing nozzle over a receiving cup.

The liquid, in this case hot water, to be mixed with the powdered ingredients is provided through a hot water circulating system. A water regulator supplies water at a constant pressure to a hot water boiler, not shown in the drawing. From the boiler, the hot water passes through copper tubing 20 to a water manifold 21 located behind the mixing nozzles 17. Continuous circulation of the water is maintained by means of a return tube 22 from the water manifold to the boiler. Thus, a constant supply of hot water is available for mixture with the powdered food.

The use of the water regulator to supply the water to the system at a constant pressure eliminates the possibility of variations in the water line pressure from affecting the amount of water mixed with the powder in each beverage. We have found 30 p.s.i. water pressure to be satisfactory with our apparatus to supply the water needed to provide a 6 oz. drink in approximately 4.5 seconds. The flow of hot water to each of the mixing nozzles 17 through tubing 23 is controlled by an individual electrically operated valve 24.

Figure 3:
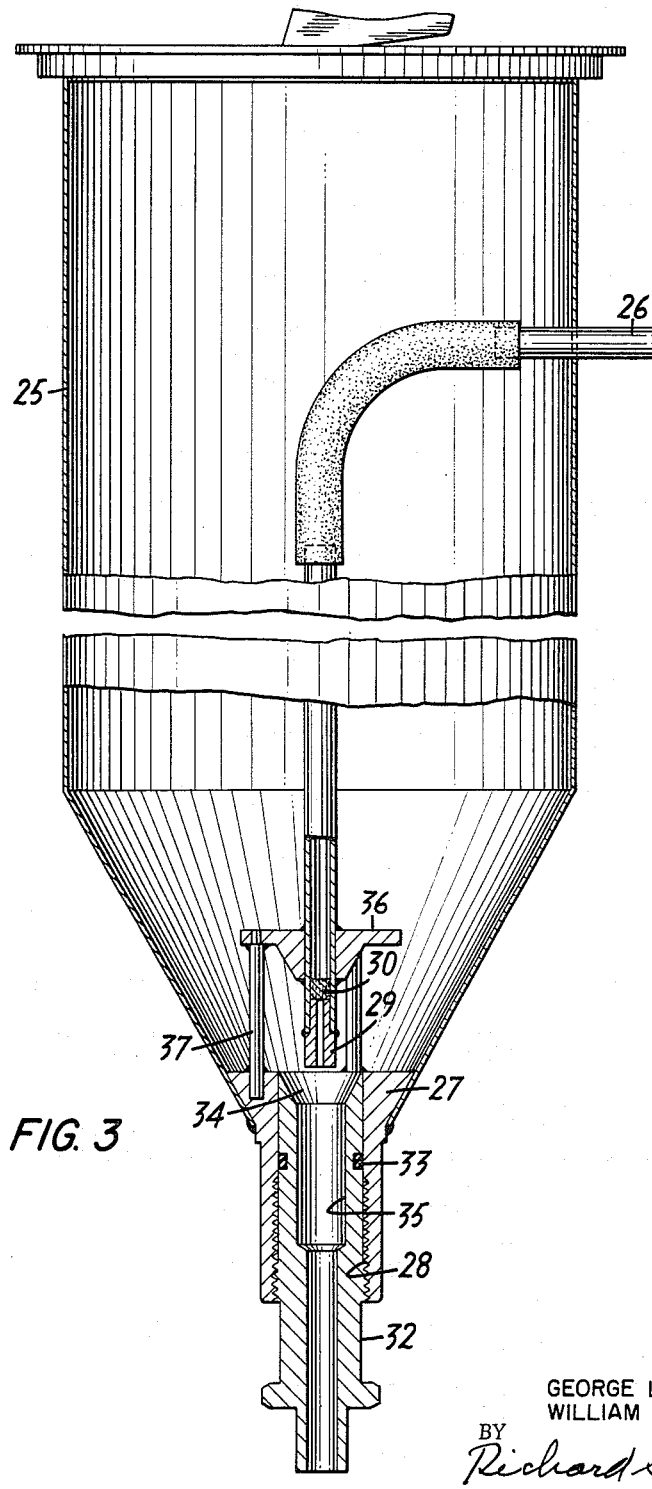
FIGURE 3 is an enlarged detailed vertical section through the hopper and ejector employed in FIGS. 1 and 2.

The powdered food dispenser of the invention is shown in detail in FIG. 3. The dispenser comprises a cylindrical wall 25 having a tapered lower portion which terminates in a discharge member 27 having a central bore which is threaded at the discharge end as at 28. Inert gas supply tube 26 enters through the side wall of the wall 25, its outlet end terminating approximately on a level with the inlet end of the discharge member 27 and concentric with the central bore therethrough.

Mounted in the discharge end of the tube 26 is a spud 29, having a bore diameter in the order of $\frac{1}{16}$ in., to meter the inert gas flow into the dispenser shell. A nitrogen flow rate of about 0.01 cu. ft. per second has been found effective to meter and convey the powdered ingredients. Also mounted in the tube 26 is a porous bronze filter 30 to prevent accidental back-up of powder into the gas supply tube 26.

Adjustable ejector 32 is threaded into the central bore of discharge tube 27, O-ring 33 providing a gas-tight seal against leakage of inert gas from the interior of the wall 25 to the atmosphere. The threaded attachment of ejector 32 to the discharge member 27 permits axial adjustment of the ejector 32, thus providing a means, in combination with the pressure of the inert gas in the wall 25, of metering the powder flow from the dispenser. That is, screwing the ejector 32 further into the discharge member 27 decreases the clearance or powder flow passage area between the tapered inlet 34 to the ejector 32 and the outlet end of the inert gas supply tube 26, thus decreasing the quantity of powder which may enter the ejector 32 to become entrained in the inert gas stream issuing from the supply tube 26.

In the case where relatively small powder flows are desired, the ejector 32 may be positioned such that the outlet end of the inert gas supply tube 26 is inserted the required distance into the upper larger diameter counterbore 35 in the ejector 32. In such case, the degree of insertion will determine the flow rate of the powder. Conversely, backing out the ejector 32 increases the clearance or powder flow passage area between the tapered inlet 34 and the outlet end of supply tube 26, thus increasing the quantity of powder which may enter the ejector 32 to become entrained in the inert gas stream. The actual positioning of the ejector 32 to achieve the desired powder flow rate will depend in large part on the flow characteristics—particle size, shape and density—of the particular powdered food being dispensed. Thus, adjustable ejector 32 permit adjustment of the metering means to suit the powder.

A baffle plate 36 is supported a fixed distance above the discharge member 27 by means of three equally spaced legs 37, and serves to accurately position the outlet end of the inert gas supply tube 26 concentric with the bore 35 through discharge member 27. The baffle 36 also prevents packing of powder particles at the entrance to the ejector 32 as well as the outlet of the inert gas supply tube 26. In addition, the baffle plate 36 causes a hollow space to be formed below the plate so that the pressure of the inert gas issuing from tube 26 will be more evenly distributed within the powder supply in the wall 25. Thus, the baffle plate 36 prevents the height of the powder in the wall 25 from effecting the powder flow rate.

The mixing nozzle forming a part of the apparatus of the invention is shown in detail in FIG. 4, and comprises a shell 38 and water manifold 39. The shell 38 has a upper cylindrical inlet portion 40 and an intermediate conical mixing portion 41, the smaller diameter end of which terminates in a cylindrical discharge portion 42. Cylindrical water manifold 39 is fixedly attached into the upper cylindrical inlet portion 40 of shell 38. Mounted in a center bore in water manifold 39 is a powder delivery tube 43, to which tubing 16 is attached, which terminates within the enlarged counterbore 44 in the water manifold 39. An annular recess 45 in the external cylindrical wall of water manifold 39 mates with the inner cylindrical wall of inlet portion 40 of shell 38 to form an annular hot water chamber. Hot water enters this chamber through water inlet 46 to which tubing 23 is attached.

A multiplicity of equally spaced ports 47, arranged in a circle around the counterbore 44 in water manifold 39 provide communication between the hot water chamber 45 and the mixing portion 38 of the mixing nozzle. Ports 47 are angled to correspond to the taper on the conical mixing portion 38 such that the issuing water streams converge at a point downstream of the powder inlet. In order to prevent premature wetting of the powder, which could result in clogging of the powder delivery tube 43, an annular extension or shield 48 is provided on the water manifold 39 in line with the counterbore 44. This shield isolates the water from the powder until they reach the point of mixing. In addition, the converging angle of the ports 47 not only provides for better mixing and dissolution of the powder, but also eliminates the possibility of splash, such as would occur were the water to impinge against a wall of the mixing portion 38, prematurely wetting the powder to cause clogging or jamming of the powder delivery tube.

The circular arrangement of the water ports 47 results in an annular converging stream of water entering the mixing portion 38 of the mixing nozzle. This, as mentioned above, not only provides for better mixing and dissolution of the powder, but also ensures complete washing out of the mixing nozzle with each dispensing operation. There is no chance for residual powder left in the nozzle from one drink clogging up the nozzle or affecting the taste or composition of the next drink.

The mixing nozzle of FIG. 4 described above is suitable when only one powdered ingredient is to be mixed with a liquid. When more than one powdered food is to be combined in a dispensed beverage, such as in the case of coffee with cream and sugar, it has been found, according to our invention, preferable to put the three ingredients into solution in the liquid sequentially using the same mixing nozzle. That is, by attaching to the powder delivery tube 43 of mixing nozzle 17 an adaptor 50 as shown in FIG. 5 having three converging powder inlet passages 52, the three powdered ingredients, namely coffee, cream and sugar, may be dispensed into the same mixing nozzle.

This precludes the necessity of dividing the limited water flow (6 oz. for a 6 oz. beverage) into three separate but smaller flows as would be necessary to put the three powders into solution in three separate mixing nozzles. A division of the water flow into three smaller, separate flows has been found to result in incomplete dissolution of the powdered ingredients, prewetting of the powders with attendant clogging and plugging of the powder delivery tube, as well as the possibility of residual powder being left in the mixing nozzles. These results are due to the inadequacy of the water flow available to each mixing nozzle when the total flow is divided into three separate flows.

This will be better understood in light of the following. It is the proper combination of water flow rate and water velocity, in conjunction with the annular shape of the water stream, which provides the desired complete dissolution of the powder in the mixing nozzle as well as the complete flushing of the mixing nozzle. The water ports 47 in mixing nozzle 17 are sized such that, at 30 p.s.i. water pressure, the required total flow of liquid (6 oz. for a 6 oz. beverage cup) is fed into the mixing nozzle within the allotted time of the liquid flow cycle of the dispensing operation, 4.5 seconds, at a velocity of approximately 5.5 in. per second and a flow rate of approximately 1.3 oz. per second.

While small deviations from these velocity and flow rate figures may be tolerated, it can readily be seen that if the flow rate and velocity are too low, there is a tendency for the liquid to "dribble" down the shield 48 and cause prewetting of the powder and clogging of the powder delivery tube 43. The flow rate and velocity must be sufficient to maintain the coherence or shape of the annular stream of liquid until it reaches the point downstream in the mixing nozzle where the mixing with and dissolution of the powdered material takes place. If the water flow rate and velocity are too high, the liquid will pass out of the mixing nozzle before complete dissolution of the powder can take place.

The use of a mixing nozzle, such as is included in the apparatus of the invention, has a distinct advantage over some of the prior art apparatus in which mixing of the ingredients (powder and liquid) takes place in the receiving cup. With the mixing nozzle, better wetting and mixing of the powder and liquid is achieved such that all the powder goes into solution or, as in the case of cocoa, into suspension. This is evidenced by the fact that no sediment is left in the bottom of the cup when a drink, dispensed using the apparatus of the invention, has been consumed.

As pointed out above, an individual mixing nozzle is provided in the apparatus of the invention for each beverage to be dispensed. This precludes the possibility of any lingering taste of one drink from affecting the taste of the next but different, drink.

In FIG. 6 the selector switch 54 consists of three movable contactors on the same shaft. The timer 56 comprises a motor which locks in switch T1 and times switches T2 to T8.

In operation, at all times, whether a beverage is being dispensed from the apparatus or not, water is circulating through the water system at approximately 30 p.s.i. and the powder dispensers are pressurized to 4 p.s.i. with high purity dry nitrogen up to the powder solenoid valves 15. When the selector switch 54 is set to a particular beverage, for example black coffee, and the dispensing machine put into operation, either by inserting a coin or pushing a button, the automatic timer 56 is actuated. This timer selectively controls, through appropriate electrical connections, the water solenoid valves 24 and the powder solenoid valves 15 and is so arranged that the appropriate water valve 24 opens first to start a flow of water into the mixing nozzle 17 of the selected beverage, in this example, coffee. After a predetermined lapse of time, the powder valve 15 connected to the coffee powder dispenser opens to initiate the flow of powdered coffee into the mixing nozzle 17.

The ejector 22 in the coffee dispenser is preadjusted relative to the powder flow time cycle of the automatic timer, such that a predetermined total amount of coffee powder—1.7 gms. for the particular brand of coffee used in our tests, this amount, however, will vary from brand to brand according to the manufacturer's recommendation—is fed into the mixing nozzle in the allotted time before the automatic timer causes the coffee powder valve 15 to close. The water continues to flow into the mixing nozzle for a preselected period after the powder valve closes to ensure that all of the powder goes into solution and none is left in the mixing nozzle to plug the nozzle or contaminate the next drink.

The water is maintained at a temperature above 160° F. so that when the water—nitrogen gas—coffee powder mixture is discharged into the receiving cup, the nitrogen effervesces, but the high temperature of the water prevents the formation of film on the surface of the water-coffee mixture.

If, instead of black coffee, the beverage selection, in the above example, had been for coffee with cream and sugar, the sequence of operations would have been as follows:

(1) Water flow on. (2) Coffee powder flow on. (3) Coffee powder flow off. (4) Sugar flow on. (5) Sugar flow off. (6) Powdered cream flow on. (7) Powdered cream flow off. (8) Water flow off.

While the order in which the powdered ingredients are dispensed may vary, it is preferable that only one powder be fed into the nozzle at a time. In between one powdered ingredient flow going off and the next one coming on there is a slight time delay with the water continuously flowing in order to eliminate the possibility of "overflooding" of the powder delivery tube 43 which could possibly cause clogging of this tube.

It is important that the water flow into the mixing nozzle be initiated first and shut off last relative to the powder flow. This is to ensure that all of the powder dispensed is wetted and put into solution—no dry powder is dispensed into the receiving cup—and, as mentioned above, no dry powder is left in the mixing nozzle after the beverage is dispensed to clog up the mixing nozzle or contaminate the next drink.

The timing cycle for the above example of dispensing coffee with cream and sugar is:

Full cycle—5.5 sec.
Water flow—4.5 sec. at 1.3 oz. per sec.
Coffee—0.5 sec. at 3.4 gr. per sec.
Cream—0.4 sec. at 5.6 gr. per sec.
Sugar—0.65 sec. at 6.1 gr. per sec.

If instead of coffee, the beverage selection is cocoa, the quantity of nitrogen gas employed is much greater than with coffee. Thus, when the water-nitrogen gas—cocoa powder mixture—is discharged from the mixing nozzle into the receiving cup, the nitrogen gas therein effervesces to form a froth on the liquid cocoa mixture.

Dispensing the powdered ingredients using dry nitrogen under a small positive pressure such as 4 p.s.i. reduces any tendency for the powder tube to become plugged with powder as might happen when depending upon a gravity fed system. In the system of the invention, the pressurizing gas conveys the powder through the metering and valving means and acts as a stirrer to promote mixing in the nozzle.

The use of high purity dry nitrogen in a closed, pressurized dispenser not only preserves the flavor of the powdered food due to the nitrogen atmosphere, but also eliminates any possibility of the powder becoming contaminated or predampened by atmospheric humidity and thus cause plugging or jamming of the powder flow path. Thus, the need for any heaters or fans, such as used in some of the prior art dispensing apparatus, is eliminated.

What is claimed is:

1. Method of dispensing a powder-liquid food mixture which comprises forming the liquid into an annular shaped stream within a confined mixing zone; forming a pressurized gas-borne stream of the powder and directing it into the annulus of the liquid stream within said mixing zone, whereby premature wetting of the powder will be prevented, and dispensing the powder-liquid product from said mixing zone.

2. Method of dispensing a powder-liquid food mixture which comprises forming the liquid into an annular shaped converging stream within a mixing zone; forming separate gas-borne streams of different powders and combining them to form a common gas-borne powder stream therefrom; directing said common gas-borne powder stream into the annulus portion of the liquid stream within said mixing zone, and dispensing the resulting powder-liquid mixture from said mixing zone.

3. Method of dispensing a powdered coffee-water mixture which comprises providing a source of water at a temperature above 160° F.; forming the water into an annular shaped converging stream within a mixing zone; forming a nitrogen gas-borne stream of powdered coffee, and directing it into the annulus of water in said mixing zone, whereby the premature wetting of the powdered coffee will be prevented and whereby the final liquid coffee product mixture discharged into a receiving cup will be free of film upon the surface thereof.

4. Apparatus for dispensing a powder-liquid food mixture which comprises means for injecting downwardly converging jets of liquid from a ring of substantially equally annularly spaced orifices in a closed pressure-tight zone having a downwardly converging substantially conical confining surface below said ring of orifices to form said annular substantially conical stream of the liquid along inside a confining surface, and means for discharging the powdered ingredient under gas pressure into the annulus of said substantially conical liquid stream to impinge upon the inside thereof to avoid premature wetting of the powder and means for discharging the resulting powder-liquid mixture.

5. Apparatus for dispensing a powder-liquid food mixture which comprises means for injecting downwardly converging jets of liquid from a ring of substantially equally annularly spaced orifices in a closed pressure-tight zone having a downwardly converging substantially conical confining surface below said ring of orifices to form said annular substantially conical stream of the liquid along inside a confining surface, means for passing gas under pressure to a supply of the powder, means for ejecting powder from said pressurized supply to form a gas borne powder stream, and means for discharging said stream into the annulus of said substantially conical liquid stream to impinge upon the inside thereof and means for discharging the resulting powder-liquid mixture into a receiving cup.

6. Apparatus for dispensing a powder-liquid food mixture which comprises means for passing an annular substantially conical steram of the liquid along inside a confining surface, means for passing gas under pressure to a supply of the powder, means for ejecting powder from said pressurized supply through an orifice to form a gas borne stream, means for turning on and cutting off said stream of gas borne powder, means for adjusting the flow rate of such ejected gas borne powder comprising means for varying the area of said ejection orifice, and means for discharging the gas borne powder into the annulus of said conical liquid stream to impinge upon the inside thereof and means for dispensing the resulting powder-liquid mixture.

7. In apparatus for dispensing a powder-liquid food mixture, a powder hopper having an outlet ejector, means for supplying gas under pressure to said hopper to flow through said outlet ejector to form a gas borne powder stream, a shut off valve connected to said outlet ejector for turning on and cutting off said stream, means for adjusting the throat of said outlet ejector for varying the area of the ejection orifice, means for timing said shut off valve in relation to the selected area of said ejection orifice for regulating the ejected gas borne powder delivered by said shut off valve, a liquid mixing nozzle connected to said shut off valve and centrally receiving the charge of gas borne powder therefrom, and a manifold in said mixing nozzle having substantially equally spaced ports arranged in a circle and converging downward for supplying liquid to said mixing nozzle wherein a converging stream of liquid is formed to receive the gas borne powder therewithin and means for dispensing the resulting powder-liquid mixture into a receiving cup.

8. In apparatus for dispensing a powder-liquid food mixture, a plurality of hoppers respectively containing different powders and having outlet ejectors, means for supplying gas under pressure to said hoppers to flow through said ejectors, shut off valves respectively connected to said ejectors, liquid mixing nozzles respectively connected to said shut off valves and centrally receiving gas borne powder therefrom, means for supplying liquid to said mixing nozzles, liquid manifolds in said nozzles each having equally spaced ports arranged in a circle and converging downward for forming a converging stream of liquid about the charge of gas borne powder therein, a common receiving cup from which the selected mixture is dispersed, said mixing nozzles being supported in a group to discharge respectively into said common receiving cup.

9. In apparatus for dispensing a powder-liquid food mixture, a powder hopper comprising a shell having a tapered lower portion converging to a discharge outlet, a gas tube extending through said portion toward said outlet and having a metering orifice toward the discharge end thereof, an ejector mounted in said hopper outlet beyond said metering orifice, and a baffle mounted in said tapered portion above said ejector and having a central aperture through which said gas tube passes, said baffle preventing packing of the powder thereabove and forming an entrance chamber for said ejector.

10. In apparatus for dispensing a powder-liquid food mixture, a plurality of hoppers respectively containing different powders and having outlet ejectors, means for supplying gas under pressure to said hoppers to flow through said ejectors, shut off valves respectively connected to said ejectors, a powder joiner connected to a plurality of said shut off valves for receiving powder from these respective hoppers, and for forming a common stream therefrom, a liquid mixing nozzle from which the resulting powder-liquid mixture is dispensed connected to said powder joiner for centrally receiving said common stream of gas borne powders therefrom, and a liquid manifold in said mixing nozzle having substantially equally spaced ports arranged in a circle and converging downward for supply liquid to said mixing nozzle for forming a converging annular stream of liquid into the annulus of which the charge of joined gas borne powders is discharged from said powder joiner.

References Cited by the Examiner
UNITED STATES PATENTS

| | | | |
|---|---|---|---|
| 2,653,733 | 9/1953 | Rudd et al. | 222—460 X |
| 2,802,599 | 8/1957 | Callahan et al. | 222—129.4 X |
| 2,954,145 | 9/1960 | McCauley | 222—193 |
| 3,053,423 | 9/1962 | Mortara | 222—129.4 X |

A. LOUIS MONACELL, *Primary Examiner.*

ABRAHAM H. WINKELSTEIN, *Examiner.*